(12) United States Patent
Chen et al.

(10) Patent No.: US 11,778,188 B2
(45) Date of Patent: Oct. 3, 2023

(54) SCALAR QUANTIZER DECISION SCHEME FOR DEPENDENT SCALAR QUANTIZATION

(71) Applicant: InterDigital VC Holdings, Inc., Wilmington, DE (US)

(72) Inventors: Ya Chen, Cesson-Sevigne (FR); Fabrice Leleannec, Betton (FR); Tangi Poirier, Cesson-Sevigne (FR); Philippe De Lagrange, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/829,452

(22) Filed: Jun. 1, 2022

(65) Prior Publication Data

US 2022/0329804 A1 Oct. 13, 2022

Related U.S. Application Data

(63) Continuation of application No. 17/267,026, filed as application No. PCT/US2019/051089 on Sep. 13, 2019, now Pat. No. 11,381,822.

(30) Foreign Application Priority Data

May 20, 2019 (EP) .................................... 19305641

(51) Int. Cl.
*H04N 19/124* (2014.01)
*H04N 19/176* (2014.01)
(Continued)

(52) U.S. Cl.
CPC ......... *H04N 19/124* (2014.11); *H04N 19/176* (2014.11); *H04N 19/18* (2014.11);
(Continued)

(58) Field of Classification Search
CPC ........ H04N 19/426; H04N 9/79; H04N 19/44; H04N 19/86; G09G 5/393
See application file for complete search history.

(56) References Cited

U.S. PATENT DOCUMENTS 3,031,768 A1 10/2011 Wen
8,031,768 B2 * 10/2011 Wen .................... H04N 19/147
375/240.03
(Continued)

FOREIGN PATENT DOCUMENTS

WO WO2019027241 A1 2/2019

OTHER PUBLICATIONS

Schwarz et al., "Description of Core Experiment 7 (CE7): Quantization and coefficient coding", Document: JVET-K1027-v3, Joint Video Experts Team (JVET) of ITU-T SG 16 WP 3 and ISO/IEC JTC 1/SC 29/WG 11, 11th Meeting:Ljubljana, SI, pp. 1-16, Jul. 10-18, 2018.
(Continued)

*Primary Examiner* — Joseph Suh
(74) *Attorney, Agent, or Firm* — Xiaoan Lu

(57) ABSTRACT

When dependent scalar quantization is used, the choice of the quantizer depends on the decoding of the preceding transform coefficient, and the entropy decoding of a transform coefficient depends on quantizer choice. To maintain high throughput in hardware implementations for transform coefficient entropy coding, several decision schemes of the scaler quantizer are proposed. In one implementation, the state transition and the context model selection are based on only regular coded bins. For example, the state transition can be based on the sum of the SIG, gt1 and gt2 flags, the exclusive-or function of the SIG, gt1 and gt2 flags, or based on only the gt1 or gt2 flag. When a block of transform coefficients is coded, the regular mode bins can be coded first in one or more scan passes, and the remaining bypass
(Continued)

coded bins are grouped together in another one or more scan passes.

10 Claims, 9 Drawing Sheets

(51) Int. Cl.
  *H04N 19/18* (2014.01)
  *H04N 19/91* (2014.01)
  *H04N 19/42* (2014.01)
  *H04N 19/46* (2014.01)
  *H04N 19/48* (2014.01)
  *H04N 19/70* (2014.01)

(52) U.S. Cl.
  CPC .............. *H04N 19/91* (2014.11); *H04N 19/42* (2014.11); *H04N 19/46* (2014.11); *H04N 19/48* (2014.11); *H04N 19/70* (2014.11)

(56) References Cited

U.S. PATENT DOCUMENTS

| | | | |
|---|---|---|---|
| 2009/0232204 A1* | 9/2009 | Lee | H04N 19/146 375/E7.076 |
| 2013/0188683 A1* | 7/2013 | Kim | H04N 19/157 375/E7.126 |
| 2020/0021855 A1* | 1/2020 | Kuusela | H04N 19/13 |
| 2021/0281846 A1* | 9/2021 | Hsiang | H04N 19/167 |
| 2021/0334931 A1* | 10/2021 | Kwon | H04N 19/467 |

OTHER PUBLICATIONS

Schwarz et al, "Non-CE7: Alternative Entropy Coding for Dependent Quantization", Document: JVET-K0072, Joint Video Experts Team (JVET of ITU-T SG 16 WP 3 and ISO/IEC JTC 1/SC 29/WG 11, 11th Meeting: Ljubljana, SI, pp. 1-12, Jul. 10-18, 2018.

Dong et al., "CE7-Related: TCQ with high Throughput Coefficient Coding", Document JVET-K0319-v2, Joint Video Experts Team (JVET) of ITU-T SG 16 WP 3 and ISO/IEC JTC 1/SC 29/WG 11, 11th Meeting: Ljubljana, SI, pp. 1-5, Jul. 10-18, 2018.

Chen et al., "Algorithm description for Versatile Video Coding and Test Model 4 (VTM 4)", Document JVET-M1002-v2, Joint Video Experts Team (JVET) of ITU-T SG 16 WP 3 and ISO/IEC JTC 1/SC 29/WG 11, 13th Meeting: Marrakech, MA, pp. 1-63, Jan. 9-18, 2019.

Bartnik et al., "Description of SDR, HDR, and 360° video coding technology proposal by Fraunhofer HHI",Document JVET-J0014-v1, Joint Video Experts Team (JVET) of ITU-SG 16 WP 3 and ISO/IEC JTC 1/SC 29/WG 11,10th Meeting: pp. 1-114, San Diego, US, Apr. 10-20, 2018.

Dong et al., "CE7-Related: TCQ with High Throughout put Coefficient Coding", Document: JVET-K0319-v4, Joint Video Experts Team (JVET) of ITU-T SG 16 WP 3 and ISO/IEC JTC 1/SC 29/WG 11, 11th Meeting: Ljubjlana, SI, pp. 1-5,Jul. 10-18, 2018.

Chen et al., "Algorithm description for Versatile Coding and Test Model 1 (VTM 1)", Document: JVET-J1002-v2, Joint Video Experts Team (JVET) of ITU-T SG 16 WP 3 and ISO/IEC JTC 1/SC 29/WG 11, 10th Meeting, pp. 1-9, San Diego, US, Apr. 10-20, 2018.

Anonymous, "High Efficiency Video Coding", Series H: Audiovisual and Multimedia Systems, Infrastructure of audiovisual services—Coding of moving video, ITU-T, H.265, pp. 1-636, Apr. 2015.

* cited by examiner

*m = SUM (SIG, gt1, gt2)

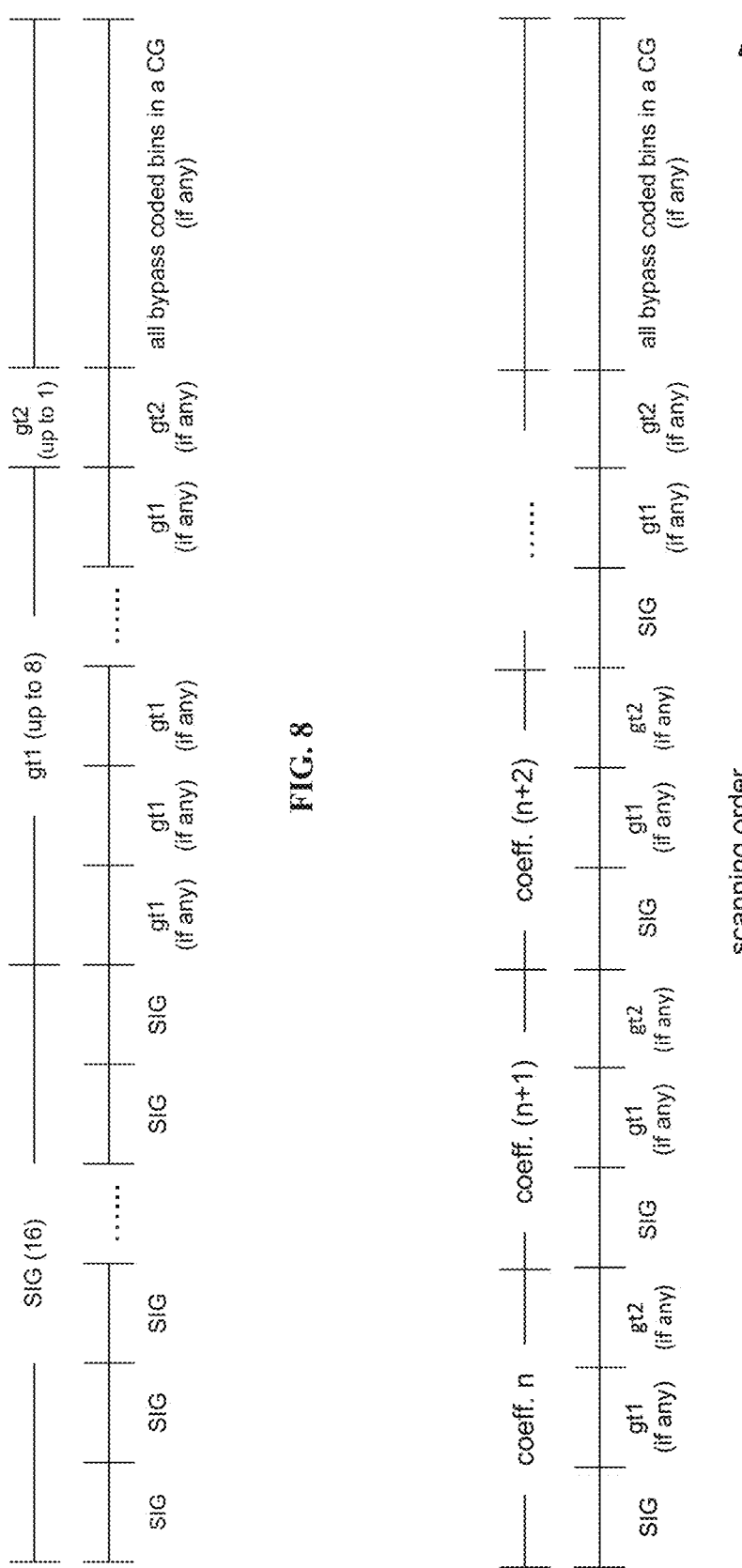

SCALAR QUANTIZER DECISION SCHEME FOR DEPENDENT SCALAR QUANTIZATION

CROSS-REFERENCE TO RELATED APPLICATIONS

This application is a Continuation of U.S. application Ser. No. 17/267,026, filed Feb. 9, 2021, which is a National Phase entry under 35 U.S.C. § 371 of International Application No. PCT/US2019/051089, filed Sep. 13, 2019, which claims the benefit of European Patent Application No. 18290103.3, filed Sep. 21, 2018 and European Patent Application No. 19305641.3, filed May 20, 2019, the entirety of which is incorporated by reference herein.

TECHNICAL FIELD

The present embodiments generally relate to a method and an apparatus for video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method of video decoding is provided, comprising: accessing a first set of parameters associated with a first transform coefficient in a block of a picture, said first transform coefficient preceding in a decoding order a second transform coefficient in said block of said picture; accessing a second set of parameters associated with said second transform coefficient, said first and second sets of parameters being entropy coded in a regular mode, wherein context modeling for at least a parameter in said second set of parameters for said second transform coefficient depends on decoding of said first transform coefficient; entropy decoding said first and second sets of parameters in the first scan pass for said block, wherein the first scan pass is performed before other scan passes for entropy decoding transform coefficients of said block, and wherein each set of said first and second sets of parameters for said first and second transform coefficients includes at least one of a gt1 flag and a gt2 flag, said gt1 flag indicating whether the absolute value of a corresponding transform coefficient is greater than 1, and said gt2 flag indicating whether the absolute value of said corresponding transform coefficient is greater than 2; and reconstructing said block responsive to said decoded transform coefficients.

According to an embodiment, a method of video encoding is provided, comprising: accessing a first set of parameters associated with a first transform coefficient in a block of a picture, said first transform coefficient preceding in an encoding order a second transform coefficient in said block of said picture; accessing a second set of parameters associated with said second transform coefficient, said first and second sets of parameters being entropy coded in a regular mode, wherein context modeling for at least a parameter in said second set of parameters for said second transform coefficient depends on said first transform coefficient; and entropy encoding said first and second sets of parameters in the first scan pass for said block, wherein the first scan pass is performed before other scan passes for entropy encoding transform coefficients of said block, and wherein each set of said first and second sets of parameters for said first and second transform coefficients includes at least one of a gt1 flag and a gt2 flag, said gt1 flag indicating whether the absolute value of a corresponding transform coefficient is greater than 1, and said gt2 flag indicating whether the absolute value of said corresponding transform coefficient is greater than 2.

According to another embodiment, an apparatus for video decoding is provided, comprising one or more processors, wherein said one or more processors are configured to: access a first set of parameters associated with a first transform coefficient in a block of a picture, said first transform coefficient preceding in a decoding order a second transform coefficient in said block of said picture; access a second set of parameters associated with said second transform coefficient, said first and second sets of parameters being entropy coded in a regular mode, wherein context modeling for at least a parameter in said second set of parameters for said second transform coefficient depends on decoding of said first transform coefficient; entropy decode said first and second sets of parameters in the first scan pass for said block, wherein the first scan pass is performed before other scan passes for entropy decoding transform coefficients of said block, and wherein each set of said first and second sets of parameters for said first and second transform coefficients includes at least one of a gt1 flag and a gt2 flag, said gt1 flag indicating whether the absolute value of a corresponding transform coefficient is greater than 1, and said gt2 flag indicating whether the absolute value of said corresponding transform coefficient is greater than 2; and reconstruct said block responsive to said decoded transform coefficients. The apparatus may further comprise one or more memories coupled to said one or more processors.

According to another embodiment, an apparatus for video encoding is provided, comprising one or more processors, wherein said one or more processors are configured to: access a first set of parameters associated with a first transform coefficient in a block of a picture, said first transform coefficient preceding in an encoding order a second transform coefficient in said block of said picture; access a second set of parameters associated with said second transform coefficient, said first and second sets of parameters being entropy coded in a regular mode, wherein context modeling for at least a parameter in said second set of parameters for said second transform coefficient depends on said first transform coefficient; and entropy encoding said first and second sets of parameters in the first scan pass for said block, wherein the first scan pass is performed before other scan passes for entropy encoding transform coefficients of said block, and wherein each set of said first and second sets of parameters for said first and second transform coefficients includes at least one of a gt1 flag and a gt2 flag, said gt1 flag indicating whether the absolute value of a corresponding transform coefficient is greater than 1, and said gt2 flag indicating whether the absolute value of said corresponding transform coefficient is greater than 2.

According to another embodiment, an apparatus of video decoding is provided, comprising: means for accessing a first set of parameters associated with a first transform coefficient in a block of a picture, said first transform coefficient preceding in a decoding order a second transform coefficient in said block of said picture; means for accessing a second set of parameters associated with said second transform coefficient, said first and second sets of parameters being entropy coded in a regular mode, wherein context modeling for at least a parameter in said second set of parameters for said second transform coefficient depends on decoding of said first transform coefficient; means for entropy decoding said first and second sets of parameters in the first scan pass for said block, wherein the first scan pass is performed before other scan passes for entropy decoding transform coefficients of said block, and wherein each set of said first and second sets of parameters for said first and second transform coefficients includes at least one of a gt1 flag and a gt2 flag, said gt1 flag indicating whether the absolute value of a corresponding transform coefficient is greater than 1, and said gt2 flag indicating whether the absolute value of said corresponding transform coefficient is greater than 2; and means for reconstructing said block responsive to said decoded transform coefficients.

According to another embodiment, an apparatus of video encoding is provided, comprising: means for accessing a first set of parameters associated with a first transform coefficient in a block of a picture, said first transform coefficient preceding in an encoding order a second transform coefficient in said block of said picture; means for accessing a second set of parameters associated with said second transform coefficient, said first and second sets of parameters being entropy coded in a regular mode, wherein context modeling for at least a parameter in said second set of parameters for said second transform coefficient depends on said first transform coefficient; and means for entropy encoding said first and second sets of parameters in the first scan pass for said block, wherein the first scan pass is performed before other scan passes for entropy encoding transform coefficients of said block, and wherein each set of said first and second sets of parameters for said first and second transform coefficients includes at least one of a gt1 flag and a gt2 flag, said gt1 flag indicating whether the absolute value of a corresponding transform coefficient is greater than 1, and said gt2 flag indicating whether the absolute value of said corresponding transform coefficient is greater than 2.

According to another embodiment, a signal comprising encoded video is formed by performing: accessing a first set of parameters associated with a first transform coefficient in a block of a picture, said first transform coefficient preceding in an encoding order a second transform coefficient in said block of said picture; accessing a second set of parameters associated with said second transform coefficient said first and second sets of parameters being entropy coded in a regular mode, wherein context modeling for at least a parameter in said second set of parameters for said second transform coefficient depends on said first transform coefficient; and entropy encoding said first and second sets of parameters in the first scan pass for said block, wherein the first scan pass is performed before other scan passes for entropy encoding transform coefficients of said block, and wherein each set of said first and second sets of parameters for said first and second transform coefficients includes at least one of a gt1 flag and a gt2 flag, said gt1 flag indicating whether the absolute value of a corresponding transform coefficient is greater than 1, and said gt2 flag indicating whether the absolute value of said corresponding transform coefficient is greater than 2.

BRIEF DESCRIPTION OF THE DRAWINGS

FIG. 8 is a pictorial example illustrating the order of coefficient bins in a CG, as proposed in JVET-K0319.

FIG. 9 is a pictorial example illustrating the order of coefficient bins in a CG, according to one embodiment.

DETAILED DESCRIPTION

Figure 1:
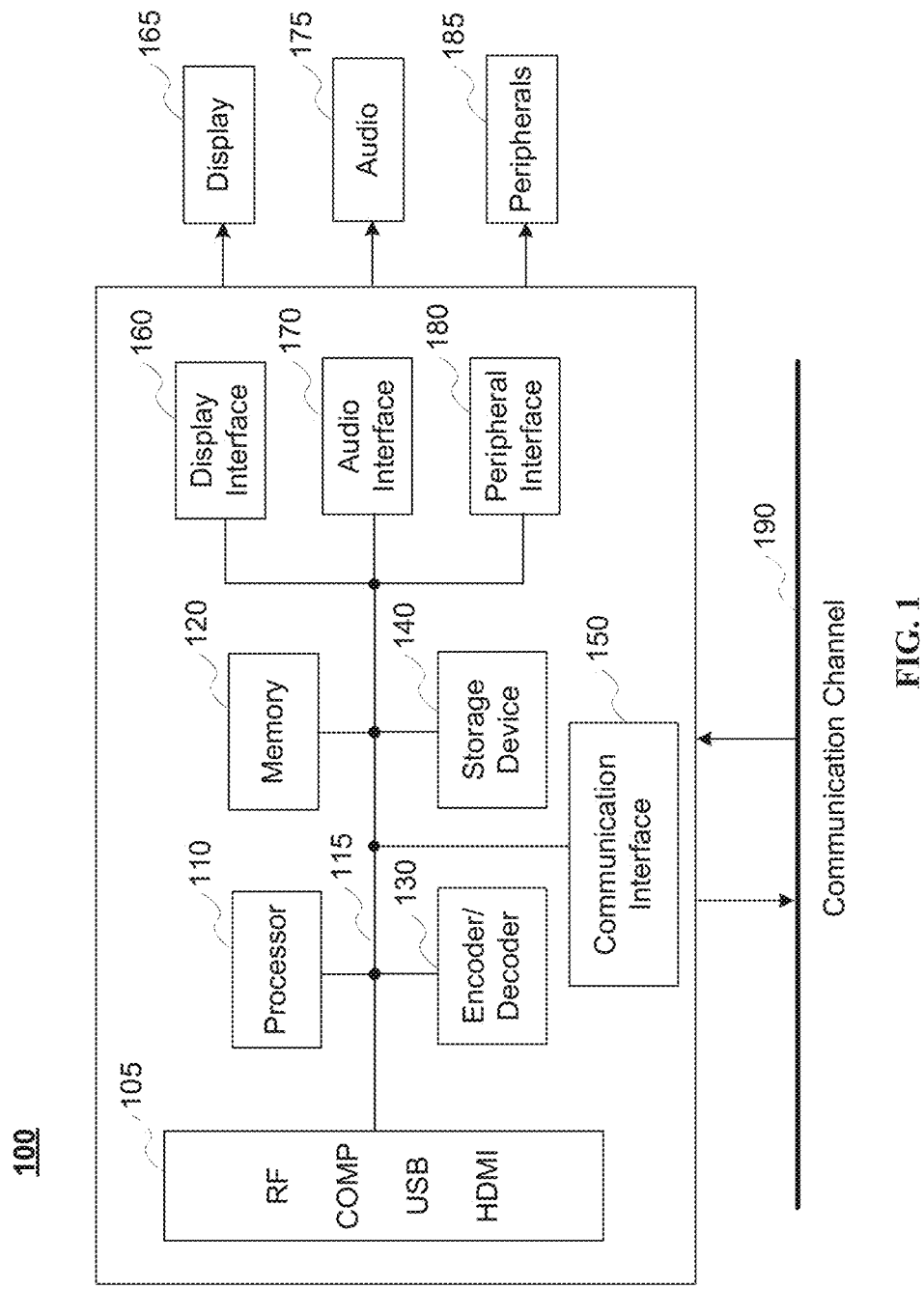
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
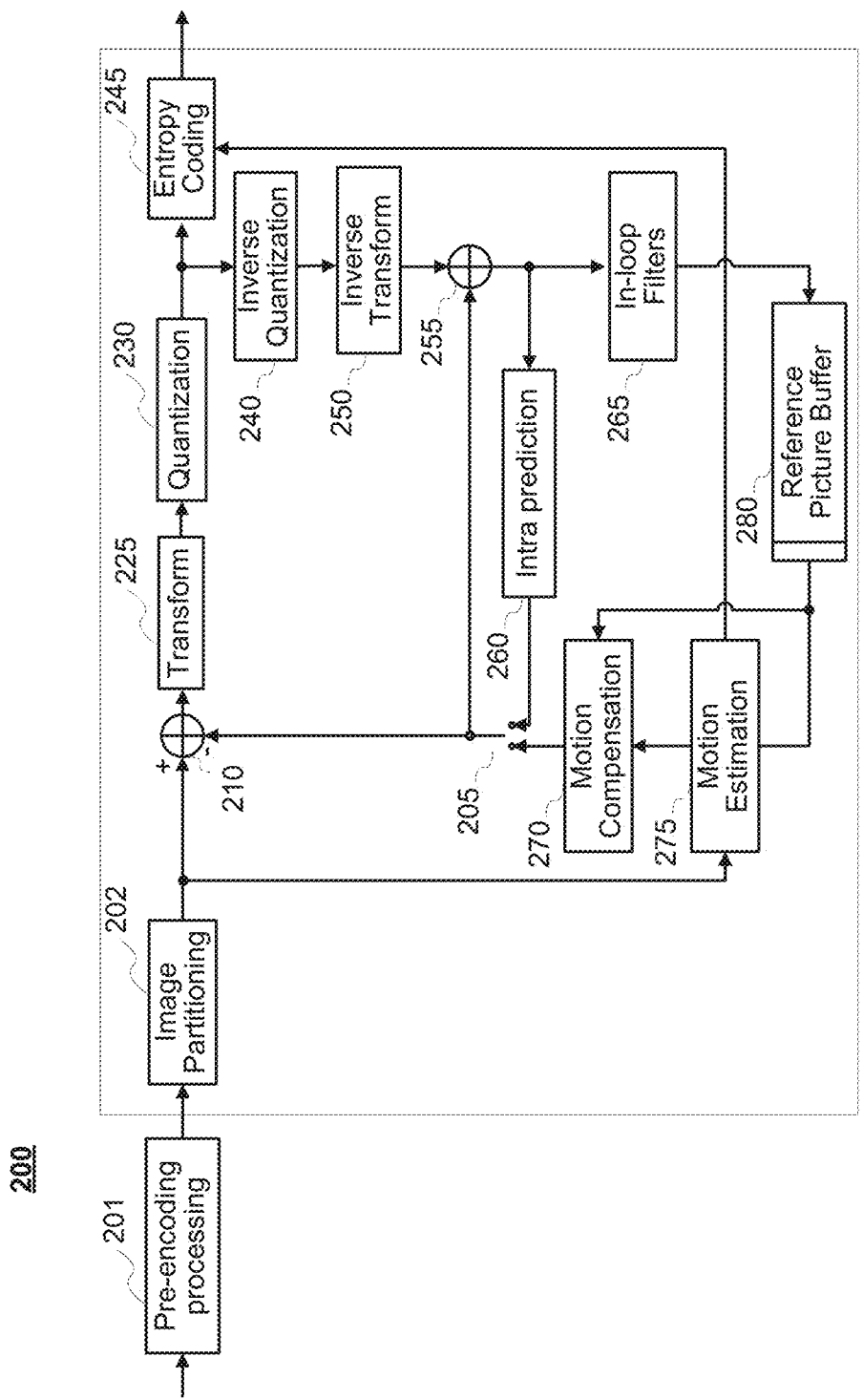
FIG. 2 illustrates a block diagram of an embodiment of a video encoder.

FIG. 2 illustrates an example video encoder 200, such as a High Efficiency Video Coding (HEVC) encoder. FIG. 2 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

To encode a video sequence with one or more pictures, a picture is partitioned (202), for example, into one or more slices where each slice can include one or more slice segments. In HEVC, a slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding according to HEVC, a picture is partitioned into coding tree blocks (CTB) of square shape with a configurable size (typically at 64×64, 128×128, or 256×256 pixels), and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). A Transform Block (TB) larger than 4×4 is divided into 4×4 sub-blocks of quantized coefficients called Coefficient Groups (CG). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CG, CB, PB, and TB. In addition, the term "block" can also be used to refer to a macroblock and a partition as specified in H.264/AVC or other video coding standards, and more generally to refer to an array of data of various sizes.

In the encoder 200, a picture is encoded by the encoder elements as described below. The picture to be encoded is processed in units of, for example, CUs. Each coding unit is encoded using either an intra or inter mode. When a coding unit is encoded in an intra mode, it performs intra prediction (260). In an inter mode, motion estimation (275) and compensation (270) are performed. The encoder decides (205) which one of the intra mode or inter mode to use for encoding the coding unit, and indicates the intra/inter decision by a prediction mode flag. Prediction residuals are calculated by subtracting (210) the predicted block from the original image block.

The prediction residuals are then transformed (225) and quantized (230). The quantized transform coefficients, as well as motion vectors and other syntax elements, are entropy coded (245) to output a bitstream. As a non-limiting example, context-based adaptive binary arithmetic coding (CABAC) can be used to encode syntax elements into the bitstream.

To encode with CABAC, a non-binary syntax element value is mapped to a binary sequence, called a bin string, through a binarization process. For a bin, a context model is selected. A "context model" is a probability model for one or more bins and is chosen from a selection of available models depending on the statistics of recently coded symbols. The context model of each bin is identified by a context model index (also used as "context index"), and different context indices correspond to different context models. The context model stores the probability of each bin being '1' or '0', and can be adaptive or static. The static model triggers a coding engine with an equal probability for bins '0' and '1'. In the adaptive coding engine, the context model is updated based on the actual coded value of a bin. The operation modes corresponding to the adaptive and static models are called the regular mode and the bypass mode, respectively. Based on the context, a binary arithmetic coding engine encodes or decodes a bin according to the corresponding probability model.

A scan pattern converts a 2-D block into a 1-D array and defines a processing order for the samples or coefficients. A scan pass is an iteration over the transform coefficients in a block (as per the selected scan pattern) in order to code a particular syntax element.

In HEVC, a scan pass over a TB then consists in processing each CG sequentially according to a scanning pattern (diagonal, horizontal, vertical), and the 16 coefficients inside each CG are scanned according to a considered scanning order as well. Scanning starts at the last significant coefficient in the TB, and processes all coefficients until the DC coefficient. CGs are scanned sequentially. Up to five scan passes are applied to a CG. Each scan pass codes a syntax element for the coefficients within a CG, as follows:

Significant coefficient flag (SIG, significant_coeff_flag): significance of a coefficient (zero/non-zero).

Coefficient absolute level greater than one flag (gt1, coeff_abs_level_greater1_flag): indicates if the absolute value of a coefficient level is greater than 1.

Coefficient absolute level greater than two flag (gt2, coeff_abs_level_greater2_flag): indicates if the absolute value of a coefficient level is greater than 2.

Coefficient sign flag (coeff_sign_flag): sign of a significant coefficient (0: positive, 1: negative).

Coefficient remaining absolute level (coeff_abs_level_remaining): remaining value for absolute value of a coefficient level (if value is larger than that coded in previous passes). At most 8 coeff_abs_level_greater1_flags may be coded in a given CG, and the coeff_abs_level_greater2_flag is only coded for the first coefficient in a CG with magnitude larger than 1.

In each scan pass, a syntax is coded only when necessary as determined by the previous scan passes. For example, if a coefficient is not significant, the remaining scan passes are not necessary for that coefficient. The bins in the first three scan passes are coded in a regular mode, where the context model index is dependent on the particular coefficient's position in the TB and on the values of previously coded coefficients in the neighborhood covered by a local template. The bins in scan passes 4 and 5 are coded in a bypass mode, so that all the bypass bins in a CG are grouped together.

The encoder may also skip the transform and apply quantization directly to the non-transformed residual signal, for example, on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture, for example, to perform deblocking/SAO (Sample Adaptive Offset) filtering to reduce encoding artifacts. The filtered image is stored at a reference picture buffer (280).

Figure 3:
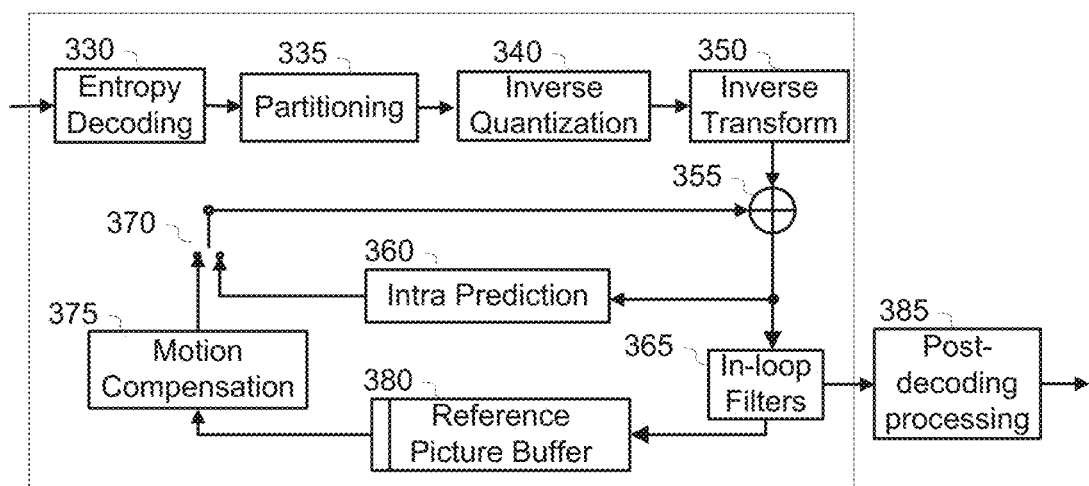
FIG. 3 illustrates a block diagram of an embodiment of a video decoder.

FIG. 3 illustrates a block diagram of an example video decoder 300, such as an HEVC decoder. In the decoder 300, a bitstream is decoded by the decoder elements as described below. Video decoder 300 generally performs a decoding pass reciprocal to the encoding pass as described in FIG. 2, which performs video decoding as part of encoding video data. FIG. 3 may also illustrate a decoder in which improvements are made to the HEVC standard or a decoder employing technologies similar to HEVC, such as a VVC decoder.

In particular, the input of the decoder includes a video bitstream, which may be generated by video encoder 200. The bitstream is first entropy decoded (330) to obtain transform coefficients, motion vectors, picture partitioning information, and other coded information. If CABAC is used for entropy coding, the context models are initialized in the same manner as the encoder context models, and syntax elements are decoded from the bitstream based on the context models.

The picture partitioning information indicates how the picture is partitioned, for example, the size of the CTUs, and a manner a CTU is split into CUs, and possibly into PUs when applicable. The decoder may therefore divide (335) the picture, for example, into CTUs, and each CTU into CUs, according to the decoded picture partitioning information. The transform coefficients are de-quantized (340) and inverse transformed (350) to decode the prediction residuals.

Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g., conversion from YCbCr 4:2:0 to RGB 4:4:4) or an inverse remapping performing the inverse of the remapping process performed in the pre-encoding processing (201). The post-decoding processing may use metadata derived in the pre-encoding processing and signaled in the bitstream.

Dependent scalar quantization was proposed in an article entitled "Description of SDR, HDR and 360° video coding technology proposal by Fraunhofer HHI," Document WET-J0014, $10^{th}$ Meeting: San Diego, US, Apr. 10-20, 2018 (hereinafter "WET-J0014"), where two scalar quantizers with different reconstruction levels are switched for quantization. In comparison to conventional independent scalar quantization (as used in HEVC and VTM-1), the set of admissible reconstruction values for a transform coefficient depends on the values of the transform coefficient levels that precede the current transform coefficient level in the reconstruction order.

The approach of dependent scalar quantization is realized by: (a) defining two scalar quantizers with different reconstruction levels and (b) defining a process for switching between the two scalar quantizers.

Figure 4:
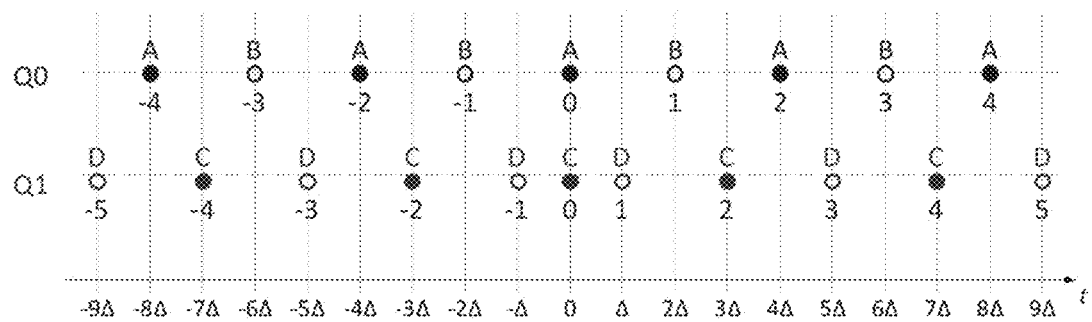
FIG. 4 is a pictorial example illustrating two scalar quantizers used in dependent quantization proposed in JVET-J0014.

The two scalar quantizers used, denoted by Q0 and Q1, are illustrated in FIG. 4. The location of the available reconstruction levels is uniquely specified by a quantization step size A. If we neglect the fact that the actual reconstruction of transform coefficients uses integer arithmetic, the two scalar quantizers Q0 and Q1 are characterized as follows:

Q0: The reconstruction levels of the first quantizer Q0 are given by the even integer multiples of the quantization step size A. When this quantizer is used, a reconstructed transform coefficient t' is calculated according to $$t'=2 \cdot k \cdot \Delta,$$

where k denotes the associated transform coefficient level. It should be noted that the term "transform coefficient level" (k) refers to the quantized transform coefficient value, for example, it corresponds to TransCoeffLevel as described in the residual_coding syntax structures hereinafter. The term "reconstructed transform coefficient" (t') refers to the de-quantized transform coefficient value.

Q1: The reconstruction levels of the second quantizer Q1 are given by the odd integer multiples of the quantization step size A and, in addition, the reconstruction level equal to zero. The mapping of transform coefficient levels k to reconstructed transform coefficients t' is specified by $$t'=(2 \cdot k-\text{sgn}(k)) \cdot \Delta,$$

where sgn(•) denotes the signum function, sgn(x)= (k==0?0:(k<0?−1:1)).

The scalar quantizer used (Q0 or Q1) is not explicitly signalled in the bitstream. Instead, the quantizer used for a current transform coefficient is determined by the parities of the transform coefficient levels that precede the current transform coefficient in the coding/reconstruction order.

Figure 5:
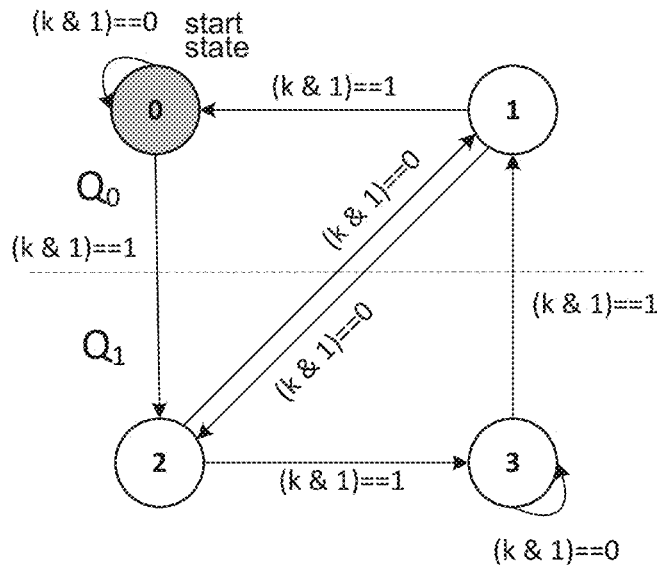
FIG. 5 is a pictorial example illustrating state transition and quantizer selection for dependent quantization proposed in JVET-J0014.

As illustrated in FIG. 5, the switching between the two scalar quantizers (Q0 and Q1) is performed via a state machine with four states. The state can take four different values: 0, 1, 2, 3. The state is uniquely determined by the parities of the transform coefficient levels preceding the current transform coefficient in the coding/reconstruction order. At the start of the inverse quantization for a transform block, the state is set equal to 0. The transform coefficients are reconstructed in the scanning order (i.e., in the same order they are entropy encoded/decoded). After a current transform coefficient is reconstructed, the state is updated as shown in Table 1, where k denotes the value of the transform coefficient level. Note that the next state only depends on the current state and the parity (k & 1) of the current transform coefficient level k. With k representing the value of the current transform coefficient level, the state update can be written as $$\text{state}=\text{stateTransTable}[\text{state}][k\&1],$$

where stateTransTable represents the table shown in FIG. 5 and Table 1, and the operator & specifies the bit-wise "and" operator in two's-complement arithmetic.

The state uniquely specifies the scalar quantizer used. If the state for a current transform coefficient is equal to 0 or 1, scalar quantizer Q0 is used. Otherwise (the state is equal to 2 or 3), scalar quantizer Q1 is used.

TABLE 1

| current state | next state for ... | |
|---|---|---|
| | (k & 1) == 0 | (k & 1) == 1 |
| 0 | 0 | 2 |
| 1 | 2 | 0 |
| 2 | 1 | 3 |
| 3 | 3 | 1 |

More generally, the quantizer of a transform coefficient can be chosen among more than two scalar quantizers, and the state machine can have more than four states. Or the quantizer switching could be processed via other possible mechanisms.

A coefficient coding scheme coupled with dependent scalar quantization was also proposed in JVET-J0014, by which the context modeling for a quantized coefficient depends on the quantizer it used. Specifically, each of the significance flag (SIG) and the greater than one flag (gt1) has two sets of context models, and the set selected for a particular SIG or gt1 depends on the quantizer used for the associated coefficient. Therefore, the coefficient coding proposed in JVET-J0014 requires full reconstruction of the absolution level (absLevel) of the quantized coefficient before moving to the next scanning position, in order to know the parity that is used to determine the quantizer and thus the context sets for the next coefficient. That is, to get the context model in order to entropy decode coefficient (n+1), the entropy decoding of coefficient n (SIG, gt1, . . . , gt4, sign flag, absolute remaining level) needs to be completed. Consequently, some regular coded bins of coefficient (n+1) needs to wait the decoding of some bypass coded bins of coefficient n, and thus, the bypass coded bins of different coefficients are interleaved with regular coded bins as shown in FIG. 6.

Figure 6:
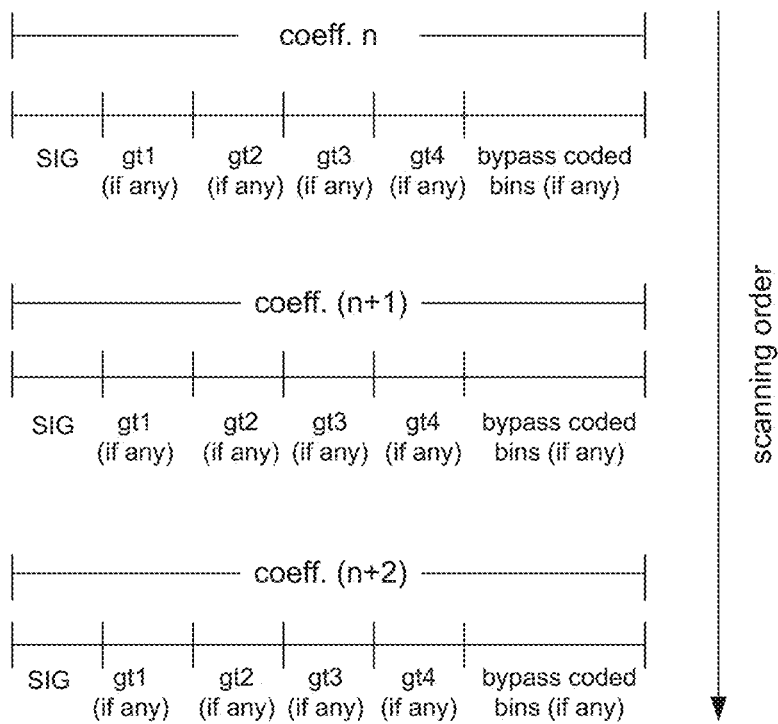
FIG. 6 is a pictorial example illustrating the order of coefficient bins in a CG, as proposed in JVET-J0014.

The design of the coefficient coding in JVET-J0014, as shown in FIG. 6, may degrade the throughput compared with the design in HEVC or VTM-1, as explained below:
1. Regular coded bins are increased. Regular coded bins are processed slower than bypass coded bins, due to context selection and interval subdivision calculation. With the coefficient coding in JVET-J0014, the number of regular coded bins in a coefficient group (CG) is up to 80, compared with 25 in VTM-1 (16 for SIG, 8 for gt1, and 1 for gt2).
2. Bypass coded bins are not grouped. Grouping bypass bins together into longer chains increases the number of bins processed per cycle and thus reduces the number of cycles required to process a single bypass bin. However, with the coefficient coding in JVET-J0014, the bypass coded bins in a CG are not grouped; instead, they are interleaved with regular coded bins per coefficient.

The present application is directed to decision schemes of the scalar quantizer to achieve almost the same level of throughput as the coefficient coding design in HEVC and VTM-1, while maintaining most of the gain provided by the dependent scalar quantization.

Figure 7:
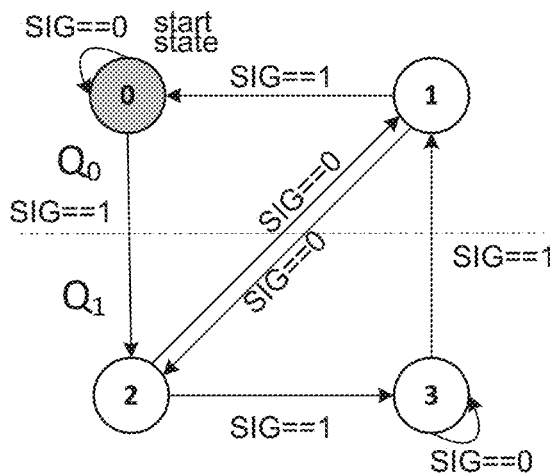
FIG. 7 is a pictorial example illustrating SIG-based state transition, as proposed in JVET-K0319.

In the contribution JVET-K0319 (see "CE7-Related: TCQ with High Throughput Coefficient Coding", Document JVET-K0319, JVET 11th Meeting: Ljubljana, SI, Jul. 10-18, 2018, hereinafter "JVET-K0319"), the parity-based state transition as proposed in JVET-J0014 is replaced by SIG-based state transition, as shown in FIG. 7 and Table 2, while other dependent scalar quantization design in JVET-J0014 remains unchanged. By doing this, the scalar quantizer used for quantizing a current transform coefficient is determined by the SIG of the quantized coefficient that precedes the current transform coefficient in the scanning order.

TABLE 2

| current state | next state for ... | |
|---|---|---|
| | sig == 0 | sig == 1 |
| 0 | 0 | 2 |
| 1 | 2 | 0 |
| 2 | 1 | 3 |
| 3 | 3 | 1 |

The coefficient coding as proposed in JVET-K0319 is based on HEVC and VTM-1 coefficient coding. The difference is that each of the SIG and gt1 has two sets of context models, and the entropy coder selects the context set for a particular SIG or gt1, according to the quantizer used by the associated coefficient. Therefore, changing the scalar quantizer of dependent scalar quantization from parity-based to SIG-based enables high throughput design similar to HEVC and VTM-1 coefficient coding. The proposed order of coefficient bins in a CG is shown in FIG. 8. That is, with the coefficient coding proposed in JVET-K0319, the regular coded bins are up to 25 per CG, which remains the same as HEVC and VTM-1 coefficient coding; all the bypass coded bins in a CG are grouped together.

The approach of dependent quantization in JVET-J0014 was tested in test 7.2.1 software of CE7 and the simulation results show 4.99% AI (All Intra), 3.40% RA (Random Access), and 2.70% LDB (Low-delay B) BD-rate reduction compared with VTM-1.0 anchor. However, the simulation results in JVET-K0319 show 3.98% AI, 2.58% RA, and 1.80% LDB BD-rate reduction compared with VTM-1.0 anchor. That is, the scalar quantizer used for quantizing a transform coefficient as JVET-K0319 (switching based on only SIG) might decrease the coding efficiency, compared to the one proposed in JVET-J0014 (switching based on full absLevel of the quantized coefficient).

The present application proposes some alternative decision schemes of the scalar quantizer used for dependent scalar quantization, to achieve a good trade-off between high throughput and coding efficiency. Instead of using the parity of the absolute level or the SIG value, the state transition and the context model selection based on the regular coded bins is proposed. In the following, several embodiments that decide the scalar quantizer used for dependent scalar quantization are described.

For the dependent scalar quantization proposed in JVET-J0014, it requires full reconstruction of the absolute level (absLevel) of the quantized coefficient before moving to the next scanning position, in order to know the parity that is used to determine the quantizer for the next coefficient. Therefore, the bypass coded bins in a CG are not grouped, and they are interleaved with regular coded bins per coefficient. Besides, in contrast to HEVC and VTM-1, the maximum number of regular coded bins per transform coefficient levels is increased (in the proposed approach in JVET-J0014, up to 5 regular coded bins per transform coefficient level can occur), as shown in the syntax table below. The changes relative to VTM-1 are in italics. The entropy coder selects the context set for a particular SIG or gt1 according to the "state", which depends on the information of the transform coefficient level and is used for deciding the quantizer. The coding order of bins is illustrated in the following syntax, where the functions getSigCtxId (xC, yC, state) is used to derive the context for the syntax sig_coeff_flag based on the current coefficient scan location (xC, yC) and state, decodeSigCoeffFlag(sigCtxId) is for decoding the syntax sig_coeff_flag with the associated context sigCtxId, getGreater1CtxId (xC, yC, state) is used to derive the context for the syntax abs_level_gt1_flag based on the current coefficient scan location (xC, yC) and state, and decodeAbsLevelGt1Flag(greater1CtxId) is for decoding the syntax abs_level_gt1_flag with the associated context greater1CtxId.

| residual_coding( x0, y0, log2TrafoSizeX, log2TrafoSizeY, cIdx ) { | Descriptor |
|---|---|
|   if( transform skip enabled flag && !cu transquant bypass flag && | |
|     ( log2TrafoSizeX + log2TrafoSizeY <= ( Log2MaxTransformSkipSize << 1 ) ) ) | |
|     transform_skip_flag[ x0 ][ y0 ][ cIdx ] | ae(v) |
|   if( CuPredMode[ x0 ][ y0 ] = = MODE_INTER && explicit_rdpcm_enabled_flag && | |
|     ( transform_skip_flag[ x0 ][ y0 ][ cIdx ] \|\| cu_transquant_bypass_flag ) ) { | |
|     explicit_rdpcm_flag[ x0 ][ y0 ][ cIdx ] | ae(v) |
|     if( explicit_rdpcm_flag[ x0 ][ y0 ][ cIdx ] ) | |
|       explicit_rdpcm_dir_flag[ x0 ][ y0 ][ cIdx ] | ae(v) |
|   } | |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbSize = ( min( log2TrafoSizeX, log2TrafoSizeY ) < 2 ? 1 : 2 ) | |
|   numSbCoeff = 1 << ( log2SbSize << 1 ) | |
|   lastScanPos = numSbCoeff | |
|   lastSubBlock = ( 1 << ( log2TrafoSizeX + log2TrafoSizeY − 2 * log2SbSize ) ) − 1 | |
|   do { | |
|     if( lastScanPos = = 0 ) { | |
|       lastScanPos = numSbCoeff | |
|       lastSubBlock− − | |
|     } | |
|     lastScanPos− − | |
|     xS = ScanOrder[ log2TrafoSizeX − log2SbSize ][ log2TrafoSizeY − log2SbSize ] | |
|       [ scanIdx ][ lastSubBlock ][ 0 ] | |
|     yS = ScanOrder[ log2TrafoSizeX − log2SbSize ][ log2TrafoSizeY − log2SbSize ] | |
|       [ scanIdx ][ lastSubBlock ][ 1 ] | |
|     xC = ( xS << log2SbSize ) + | |
|       ScanOrder[ log2SbSize ][ log2SbSize ][ scanIdx ][ lastScanPos ][ 0 ] | |
|     yC = ( yS << log2SbSize ) + | |
|       ScanOrder[ log2SbSize ][ log2SbSize ][ scanIdx ][ lastScanPos ][ 1 ] | |
|   } while( ( xC != LastSignificantCoeffX ) \|\| ( yC != LastSignificantCoeffY ) ) | |
|   for( i = lastSubBlock; i >= 0; i− − ) { | |
|     xS = ScanOrder[ log2TrafoSizeX − log2SbSize ][ log2TrafoSizeY − log2SbSize ] | |
|       [ scanIdx ][ lastSubBlock ][ 0 ] | |
|     yS = ScanOrder[ log2TrafoSizeX − log2SbSize ][ log2TrafoSizeY − log2SbSize ] | |
|       [ scanIdx ][ lastSubBlock ][ 1 ] | |
|     inferSbDcSigCoeffFlag = 0 | |
|     state = 0 | |
|     if( ( i < lastSubBlock ) && ( i > 0 ) ) { | |
|       coded_sub_block_flag[ xS ][ yS ] | ae(v) |
|       inferSbDcSigCoeffFlag = 1 | |
|     } | |
|     for( n = ( i = = lastSubBlock ) ? lastScanPos − 1 : numSbCoeff − 1; n >= 0; n− − ) { | |
|       xC = ( xS << log2SbSize ) + ScanOrder[ log2SbSize ][ log2SbSize ][ scanIdx ][ n ][ 0 ] | |

```
residual_coding( x0, y0, log2TrafoSizeX, log2TrafoSizeY, cIdx ) {                                         Descriptor
  yC = ( yS << log2SbSize ) + ScanOrder[ log2SbSize ][ log2SbSize ][ scanIdx ][ n ][ 1 ]
  if( coded_sub_block_flag[ xS ][ yS ] && ( n > 0 | | !inferSbDcSigCoeffFlag ) ) {
    sigCtxId = getSigCtxId( xC, yC, state )
    sig_coeff_flag[ xC ][ yC ] = decodeSigCoeffFlag( sigCtxId )                                           ae(v)
  }
  absLevel[ xC ][ yC ] = 0
  if( sig_coeff_flag[ xC ][ yC ] ) {
    inferSbDcSigCoeffFlag = 0
    absLevel[ xC ][ yC ] = 1
    greater1CtxId = getGreater1CtxId ( xC, yC, state )
    abs_level_gt1_flag[ xC ][ yC ] = decodeAbsLevelGt1Flag( greater1CtxId )                               ae(v)
    if(abs_level_gt1_flag[ xC ][ yC ] ) {
      absLevel[ xC ][ yC ] = 2
      abs_level_gt2_flag[ xC ][ yC ]                                                                     ae(v)
      if( abs_level_gt2_flag[ xC ][ yC ] ) {
        absLevel[ xC ][ yC ] = 3
        abs_level_gt3_flag[ xC ][ yC ]                                                                   ae(v)
        if( abs_level_gt3_flag[ xC ][ yC ] ) {
          absLevel[ xC ][ yC ] = 4
          abs_level_gt4_flag[ xC ][ yC ]                                                                 ae(v)
          if( abs_level_gt4_flag[ xC ][ yC ] ) {
            abs_level_remaining[ xC ][ yC ]                                                              ae(v)
            absLevel[ xC ][ yC ] = 5 + abs_level_remaining[ xC ][ yC ]
          }
        }
      }
    }
  }
  state = stateTransTable[ state ][ absLevel[ xC ][ yC ] & 1 ]
}
for( n = numSbCoeff - 1; n >= 0; n- - ) {
  xC = ( xS << log2SbSize ) + ScanOrder[ log2SbSize ][ log2SbSize ][ scanIdx ][ n ][ 0 ]
  yC = ( yS << log2SbSize ) + ScanOrder[ log2SbSize ][ log2SbSize ][ scanIdx ][ n ][ 1 ]
  if( sig_coeff_flag[ xC ][ yC ] ) {
    coeff_sign_flag[ xC ][ yC ]                                                                          ae(v)
    TransCoeffLevel[ x0 ][ y0 ][ cIdx ][ xC ][ yC ] =
      absLevel[ xC ][ yC ] * ( 1 - 2 * coeff_sign_flag[ xC ][ yC ] )
  }
}
}
```

As described before, there is a potential issue about the high-throughput hardware implementation because of these syntax modifications. In our proposal, alternative approaches are proposed to achieve almost the same level of throughput as in HEVC while supporting dependent scalar quantization. In the following, HEVC is used as an example to illustrate the proposed modifications.

In one embodiment, the maximum number of regular coded bins per transform coefficient levels is kept as 3 rather than 5 (SIG, gt1 and gt2 are regular coded). For each CG, the regular coded bins and the bypass coded bins are separated in coding order; first all regular coded bins for a CG are transmitted and, thereafter, the bypass coded bins are transmitted. The proposed order of coefficient bins in a CG is shown in FIG. 9. The bins for a CG are coded in multiple passes over the scan positions in a CG:

pass 1: coding of significance (SIG, sig_coeff_flag), greater than 1 flag (gt1, abs_level_gt1_flag), and greater than 2 flag (gt2, abs_level_gt2_flag) in the coding order. The greater than 1 flags are only present if sig_coeff_flag is equal to 1. Coding of greater than 2 flags (abs_level_gt2_flag) is only performed for scan positions with abs_level_gt1_flag equal to 1. The values of gt1 and gt2 are inferred to be 0 if not present in the bitstream. The SIG, gt1 and gt2 flags are coded in the regular mode, and the context modelling selection of SIG depends on which state is chosen for the associated coefficient.

pass 2: coding of the syntax element abs_level_remaining for all scan positions with abs_level_gt2_flag equal to 1. The non-binary syntax element is binarized and the resulting bins are coded in the bypass mode of the arithmetic coding engine;

pass 3: coding of the signs (coeff_sign_flag) for all scan positions with sig_coeff_flag equal to 1. Signs are coded in the bypass mode.

The above embodiment illustrates the proposed modifications compared to HEVC. The modifications could also be based on other solutions. For example, if JVET-J0014 is used as the base, context modeling of both SIG and gt1 will depend on the quantizer choice and other greater than x flags (gtx, x=3 and 4) could be coded inside pass 1 or pass 2. If other regular coded bins are present, such as gt5, gt6, gt7 flags, they could be coded inside pass 1 or pass 2. Besides, signs (coeff_sign_flag) in pass 3 could also be coded in the regular mode.

In the March 2019 meeting, JVET adopted a new residual coding process for the transform skip residual block. When transform skip (TS) is enabled, transforms are skipped for the prediction residuals. The residual levels of a coefficient group (CG) are coded in three passes over the scan positions as follows:
Pass 1: following flags are signalled
   sig_coeff_flag
   coeff_sign_flag
   greater 1 flag (abs_level_gtx_flag[0])
   parity (par_level_flag) flag
Pass 2: following flags are signalled
   greater than 3 flag (abs_level_gtx_flag[1])
   greater than 5 flag (abs_level_gtx_flag[2])
   greater than 7 flag (abs_level_gtx_flag[3])
   greater than 9 flag (abs_level_gtx_flag[4])
Pass 3: bypass coding of remaining absolute levels (abs_remainder) using Golomb-Rice coding.

The above proposed embodiment can also be applied for this new adopted TS residual coding, where the position of greater than 3 flag is moved to the first pass, for example, as illustrated in the follows:
Pass 1: following flags are signalled
   sig_coeff_flag
   coeff_sign_flag
   greater 1 flag (abs_level_gtx_flag[0])
   parity (par_level_flag) flag
   greater than 3 flag (abs_level_gtx_flag[1])
Pass 2: following flags are signalled
   greater than 5 flag (abs_level_gtx_flag[2])
   greater than 7 flag (abs_level_gtx_flag[3])
   greater than 9 flag (abs_level_gtx_flag[4])
Pass 3: bypass coding of remaining absolute levels (abs_remainder) using Golomb-Rice coding.

Embodiment 1—Scalar Quantizer Decision Scheme Based on Function SUM(SIG, Gt1, Gt2)

To solve the high-throughput hardware implementation issue, the full reconstruction of the absolute level (absLevel) of the quantized coefficient will not be performed for deciding the state, and the switching between the two scalar quantizers does not be depend on the parity of the full transform coefficient absolute level. As mentioned before, the scalar quantizer determined by SIG only as in NET-K0319 might decrease the coding efficiency. In one embodiment, we propose to decide the scalar quantizer based on the function SUM(SIG, gt1, gt2), which will take SIG, gt1 and gt2 values of the current transform coefficient together into consideration.

TABLE 3

| marking value m | gt2 | gt1 | SIG | possible transform absolute level |
|---|---|---|---|---|
| 0 | 0 | 0 | 0 | 0 |
| 1 | 0 | 0 | 1 | 1 |
| 2 | 0 | 1 | 1 | 2 |
| 3 | 1 | 1 | 1 | ≥3 |

The possible combinations of the SIG, gt1 and gt2 values of a transform coefficient are shown in Table 3. There is one-to-one correspondence mapped from these four different combinations to four possible marking level values, where m denotes the marking value of these four possible cases. The function to derive the marking value m from the SIG, gt1 and gt2 values can be written as:

$$m = \mathrm{SUM}(SIG, gt1, gt2) = SIG + gt1 + gt2.$$

Figure 10:
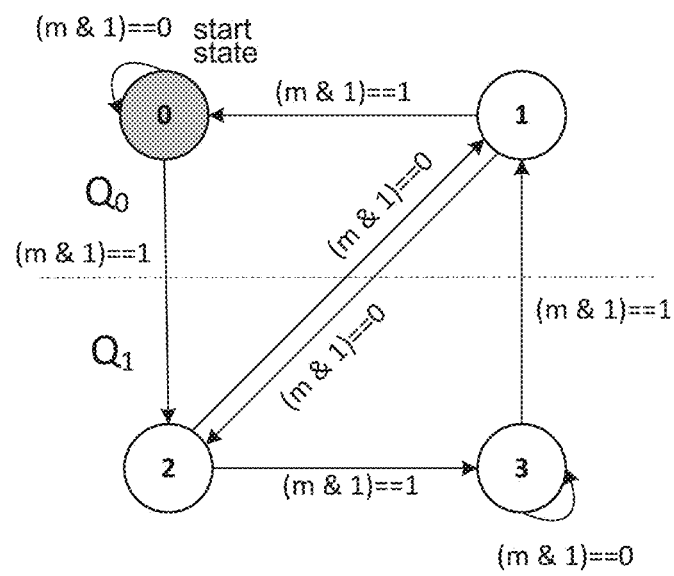
FIG. 10 is a pictorial example illustrating SUM(SIG, gt1, gt2)-based state transition, according to one embodiment.

As illustrated in FIG. 10, the switching between the two scalar quantizers is uniquely determined by the parities of the marking value m for the transform coefficient level preceding the current transform coefficient in the coding/reconstruction order. At the start of the inverse quantization for a transform block, the state is set equal to 0. After the regular coded bins of a current transform coefficient is reconstructed, the state is updated as shown in FIG. 10 and Table 4. Note that the next state only depends on the current state and the parity (m & 1) of the marking value m for the current transform coefficient level. The state update can be written as:

$$\text{state} = \text{stateTransTable}[\text{state}][m \& 1],$$

where stateTransTable represents the table shown in FIG. 10 and Table 4 and the operator & specifies the bit-wise "and" operator in two's-complement arithmetic.

TABLE 4

| | next state for . . . | |
|---|---|---|
| current state | (m & 1) == 0 | (m & 1) == 1 |
| 0 | 0 | 2 |
| 1 | 2 | 0 |
| 2 | 1 | 3 |
| 3 | 3 | 1 |

```
residual_coding( x0, y0, log2TrafoSizeX, log2TrafoSizeY, cIdx) {                                    Descriptor
   ...
   state = 0
   for( i = lastSubBlock; i >= 0; i- - ) {
      ...
      //===== first pass: regular bins of sig, gt1, gt2 =====
      for( n = ( i = = lastSubBlock ) ? lastScanPos - 1 : numSbCoeff - 1; n >= 0; n- - ) {
         m[ xC ][ yC ] = 0
         xC = ( xS << log2SbSize ) + ScanOrder[ log2SbSize ][ log2SbSize ][ scanIdx ][ n ][ 0 ]
         yC = ( yS << log2SbSize ) + ScanOrder[ log2SbSize ][ log2SbSize ][ scanIdx ][ n ][ 1 ]
         if( coded_sub_block_flag[ xS ][ yS ] && ( n > 0 | | !inferSbDcSigCoeffFlag ) ) {
            sigCtxId = getSigCtxId( xC, yC, state )
            sig_coeff_flag[ xC ][ yC ] = decodeSigCoeffFlag( sigCtxId )                              ae(v)
            m[ xC ][ yC ] += sig_coeff_flag [ xC ][ yC ]
         }
         absLevel[ xC ][ yC ] = 0
         if( sig_coeff_flag[ xC ][ yC ] ) {
            absLevel[ xC ][ yC ] = 1
```

```
residual_coding( x0, y0, log2TrafoSizeX, log2TrafoSizeY, cIdx) {                    Descriptor
        abs_level_gt1_flag[ xC ][ yC ]                                              ae(v)
        m[ xC ][ yC ] += abs_level_gt1_flag [ xC ][ yC ]
        if( abs_level_gt1_flag[ xC ][ yC ] ) {
            absLevel[ xC ][ yC ] = 2
            abs_level_gt2_flag[ xC ][ yC ]                                          ae(v)
            m[ xC ][ yC ] += abs_level_gt2_flag [ xC ][ yC ]
        }
    }
    state = stateTransTable[ state ][ m[ xC ][ yC ] & 1 ]
    }
    //===== end of first pass: regular bins of sig, gt1, gt2 =====
    //===== second pass: bypass bins of remainder =====
    for( n = numSbCoeff – 1; n >= 0; n– – ) {
        xC = ( xS << log2SbSize ) + ScanOrder[ log2SbSize ][ log2SbSize ][ scanIdx ][ n ][ 0 ]
        yC = ( yS << log2SbSize ) + ScanOrder[ log2SbSize ][ log2SbSize ][ scanIdx ][ n ][ 1 ]
        if( abs_level_gt2_flag [ xC ][ yC ] ) {
            abs_level_remaining[ xC ][ yC ]                                         ae(v)
            absLevel[ xC ][ yC ] = 3 + abs_level_remaining[ xC ][ yC ]
        }
    }
    //===== end of second pass: bypass bins of remainder =====
    //===== third pass: signs =====
    for( n = numSbCoeff – 1; n >= 0; n– – ) {
        xC = ( xS << log2SbSize ) + ScanOrder[ log2SbSize ][ log2SbSize ][ scanIdx ][ n ][ 0 ]
        yC = ( yS << log2SbSize ) + ScanOrder[ log2SbSize ][ log2SbSize ][ scanIdx ][ n ][ 1 ]
        if( sig_coeff_flag[ xC ][ yC ] ) {
            coeff_sign_flag[ xC ][ yC ]                                             ae(v)
            TransCoeffLevel[ x0 ][ y0 ][ cIdx ][ xC ][ yC ] =
                absLevel[ xC ][ yC ] * ( 1 – 2 * coeff_sign_flag[ xC ][ yC ] )
        }
    }
    //===== end of third pass: signs =====
    }
}
```

After transform and quantization, the magnitude of most transform coefficients is usually at a very low value. When the absolute level of a transform coefficient is smaller than 3, as shown in Table 3 and Table 4, our proposed method could achieve almost the same result as JVET-J0014. Meanwhile, our proposed method does not require full reconstruction of the absolution level (absLevel) of the quantized coefficient, which solved the high-throughput hardware implementation issue.

Details on the coding order and presence of bins as well as the reconstruction of transform coefficient levels from the transmitted data are given by the above syntax table. For ease of illustration, different passes over the scan positions are commented in the syntax table. The changes relative to HEVC and VTM-1 are in italics. The entropy coder selects the context set for a particular SIG according to the "state", which depends on the information of the transform coefficient level and is used for deciding the quantizer.

Embodiment 2—Scalar Quantizer Decision Scheme Based on Function XOR(SIG, gt1, gt2)

In another embodiment, SIG, gt1 and gt2 values of the current transform coefficient are taken into consideration, and the scalar quantizer is selected based on the function XOR(SIG, gt1, gt2). The function to derive the exclusive-or value x from the SIG, gt1 and gt2 values can be written as:

$$x = \text{XOR}(SIG, gt1, gt2) = SIG \hat{} gt1 \hat{} gt2.$$

The corresponding exclusive-or values x for the possible combinations of the SIG, gt1 and gt2 values of a transform coefficient are presented in Table 5.

TABLE 5

| gt2 | gt1 | SIG | Exclusive-or value x |
|---|---|---|---|
| 0 | 0 | 0 | 0 |
| 0 | 0 | 1 | 1 |
| 0 | 1 | 1 | 0 |
| 1 | 1 | 1 | 1 |

Figure 11:
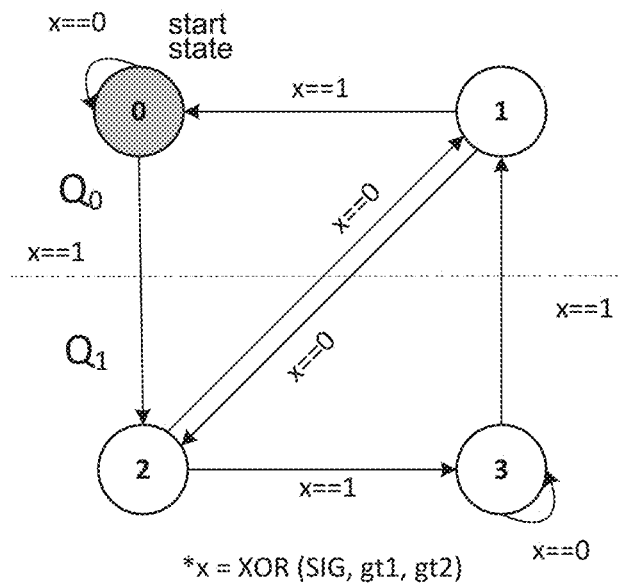
FIG. 11 is a pictorial example illustrating XOR(SIG, gt1, gt2)-based state transition, according to one embodiment.

Compared to the first embodiment, the switching between the two scalar quantizers is uniquely determined by the exclusive-or values x of the SIG, gt1 and gt2 flags. The state update can be written as:

$$state = stateTransTable[state][x],$$

where stateTransTable represents the table illustrated in FIG. 11 and Table 6. Other parts of the state machine remain similar as the previous approaches.

TABLE 6

| | next state for . . . | |
|---|---|---|
| current state | x == 0 | x == 1 |
| 0 | 0 | 2 |
| 1 | 2 | 0 |
| 2 | 1 | 3 |
| 3 | 3 | 1 |

When the absolute level of a transform coefficient is smaller than 3, as shown in Table 5 and Table 6, our proposed method could achieve almost the same result as WET-J0014. Meanwhile, our proposed method does not require full reconstruction of the absolution level (absLevel)

of the quantized coefficient, which solved the high-throughput hardware implementation issue.

Figure 12:
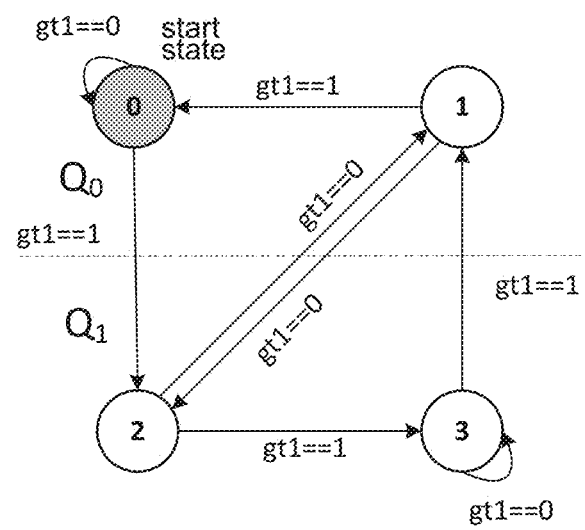
FIG. 12 is a pictorial example illustrating gt1-based state transition, according to one embodiment.

Embodiment 3—Scalar Quantizer Decision Scheme Based on One of Regular Coded Bins According to the embodiments described above, all regular coded bins of the current transform coefficient (SIG, gt1 and gt2) will be taken into consideration for deciding the scalar quantizer. In another embodiment, the switch between two scaler quantizers can be based on one of regular coded bins, for example, the gt1 flag. The previous state transition can be replaced by gt1-based state transition in this embodiment, as shown in FIG. 12, while other design remains unchanged. By doing this, the scalar quantizer used for quantizing a current transform coefficient is determined by the gt1 flag of the quantized coefficient that precedes the current transform coefficient in the scanning order. The state update can be written as:

state=stateTransTable[state][$gt1$], where stateTransTable represents the table illustrated in FIG. 12 and Table 7.

In this embodiment, the bins for a CG are coded in 3 scan passes over the scan positions in a CG: first pass for sig, gt1 and gt2, second pass for the remaining absolute level, and the third pass for the sign information. In a variant, the bins for a CG are coded in 4 scan passes over the scan positions in a CG: first pass for sig and gt1, second pass for gt2, third pass for the remaining absolute level, and the fourth pass for the sign information. This variant could further reduce the bin-to-bin dependencies, compared to the 3 scan passes proposed in previous embodiments.

TABLE 7

| | next state for . . . | |
|---|---|---|
| current state | gt1 == 0 | gt1 == 1 |
| 0 | 0 | 2 |
| 1 | 2 | 0 |
| 2 | 1 | 3 |
| 3 | 3 | 1 |

Alternatively, the scalar quantizer used for quantizing a current transform coefficient is determined by the gt2 flag of the quantized coefficient that precedes the current transform coefficient in the scanning order. More generally, the scalar quantizer used for quantizing a current transform coefficient is determined by one regular coded bin (e.g., gtx flag) of the quantized coefficient that precedes the current transform coefficient in the scanning order.

In the above examples, we illustrate several embodiments based on HEVC which uses 3 regular coded bins (SIG, gt1, gt2) for a coefficient. When the regular coded bins for a coefficient are different from what are in HEVC, the proposed embodiments can be performed by taking a different number (more or fewer than 3) of regular coded bins per transform coefficient.

In the above, the sum and exclusive-or functions are considered, the proposed embodiments can also be performed with different state updating derivation (I/O) functions from regular coded bins per transform coefficient level.

In the above, the descriptions are mainly with respect to de-quantization. It should be noted that quantization is adjusted accordingly. The scalar quantizer used (Q0 or Q1) is not explicitly signalled in the bitstream. For example, a quantization module at the encoder side would select which quantizer to use for a current transform coefficient based on the state. If the state for a current transform coefficient is equal to 0 or 1, the scalar quantizer Q0 is used. Otherwise (the state is equal to 2 or 3), the scalar quantizer Q1 is used. The state is uniquely determined by the information of the transform coefficient level, using the methods as described in FIGS. 10-12, and the decoder would select the same quantizer in order to decode the bitstream properly.

Figure 13:
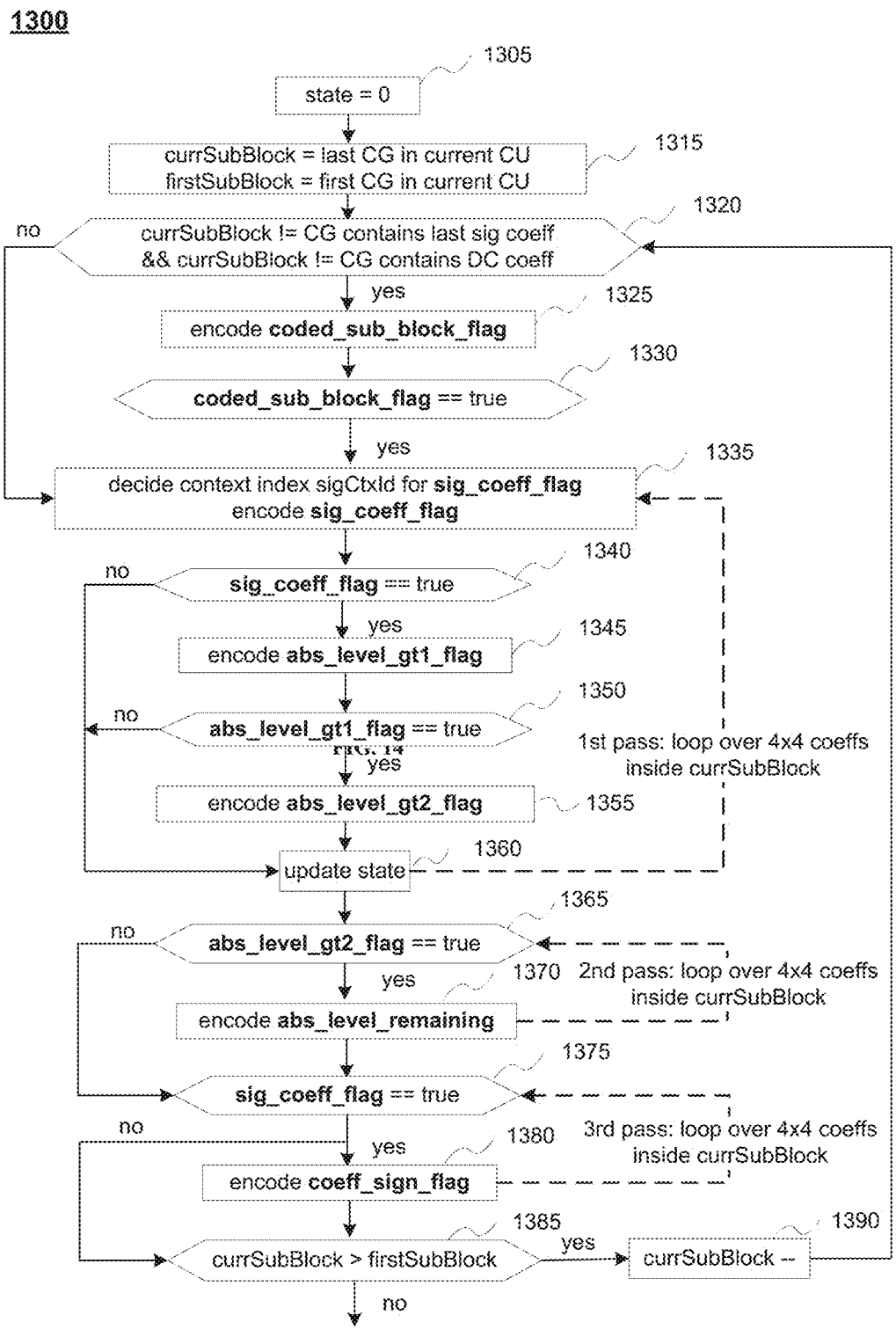
FIG. 13 illustrates a process of encoding a current block, according to an embodiment.

FIG. 13 illustrates a method (1300) for encoding a current coding unit, according to an embodiment. At step 1305, the initial state is set to zero. To encode the coding unit, the coefficients in the coding unit are scanned. A scan pass for the coding unit processes each CG of the coding unit sequentially according to a scanning pattern (diagonal, horizontal, vertical), and the coefficients inside each CG are scanned according to a considered scanning order as well. Scanning starts (1315) at the CG with the last significant coefficient in the coding unit, and processes all coefficients until the first CG with the DC coefficient.

If a CG does not contain the last significant coefficient or the DC coefficient (1320), a flag (coded_sub_block_flag) indicating whether a CG contains any non-zero coefficients is encoded (1325). For the CG that contains the last non-zero level or the DC coefficient, the coded_sub_block_flag is inferred to be equal to 1, and is not presented in the bitstream.

If the coded_sub_block_flag is true (1330), 3 scan passes are applied to the CG. In the first pass (1335-1360), for a coefficient, the SIG flag (sig_coeff_flag) is encoded (1335). To encode the SIG flag, a context mode index is decided using the state, for example, sigCtxId=getSigCtxId (state). If the SIG flag is true (1340), the gt1 flag (abs_level_gt1_flag) is encoded (1345). If the gt1 flag is true (1350), the gt2 flag (abs_level_gt2_flag) is encoded (1355). Based on one or more of the SIG, gt1 and gt2 flags, the state is updated (1360), for example, using the methods as described in FIGS. 10-12.

In the second scan pass (1365, 1370), the encoder checks whether the gt2 flag is true (1365). If it is true, the remaining absolute level (abs_level_remaining) is encoded (1370). In the third scan pass (1375, 1380), the encoder checks whether the SIG flag is true (1375). If it is true, the sign flag (coeff_sign_flag) is encoded (1380). At step 1385, the encoder checks whether there are more CG to be processed. If yes, it moves on to the next CG to be processed (1390).

Figure 14:
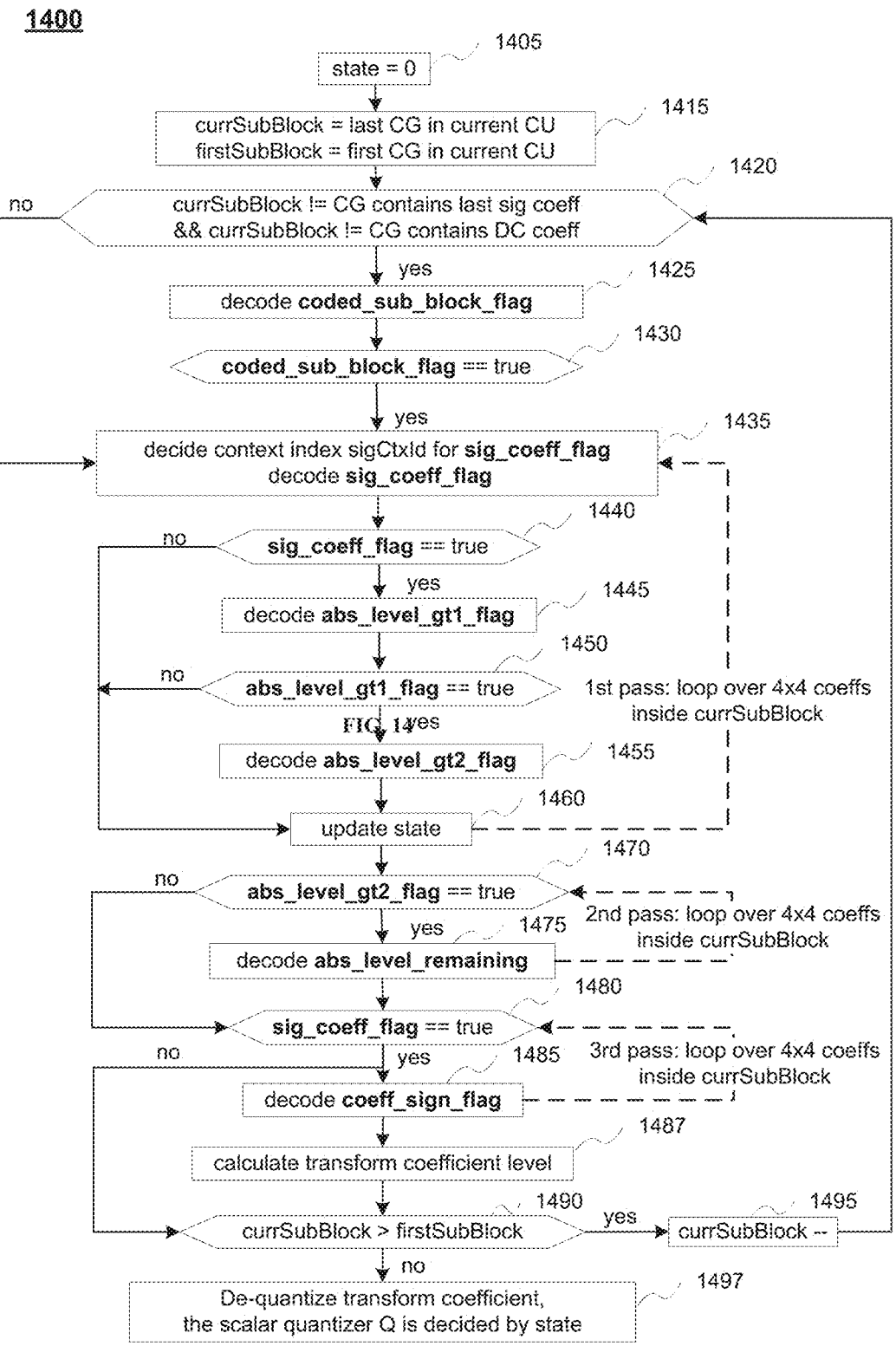
FIG. 14 illustrates a process of decoding a current block, according to an embodiment.

FIG. 14 illustrates a method (1400) for decoding a current coding unit, according to an embodiment. At step 1405, the initial state is set to zero. Similar to the encoder side, to decode the coding unit, the coefficient positions in the coding unit are scanned. Scanning starts (1415) at the CG with the last significant coefficient in the coding unit, and processes all coefficients until the first CG with the DC coefficient.

If a CG does not contain the last significant coefficient or the DC coefficient (1420), a flag (coded_sub_block_flag) indicating whether a CG contains any non-zero coefficients is decoded (1425). For the CG that contain the last non-zero level or the DC coefficient, the coded_sub_block_flag is inferred to be equal to 1.

If the coded_sub_block_flag is true (1430), 3 scan passes are applied to the CG. In the first pass (1435-1460), for a coefficient, the SIG flag (sig_coeff_flag) is decoded (1435). To decode the SIG flag, a context mode index is decided using the state, for example, sigCtxId=getSigCtxId (state). If the SIG flag is true (1440), the gt1 flag (abs_level_gt1_flag) is decoded (1445). If the gt1 flag is true (1450), the gt2 flag (abs_level_gt2_flag) is decoded (1455). Based on one or more of the SIG, gt1 and gt2 flags, the state is updated (1460), for example, using the methods as described in FIGS. 10-12.

In the second scan pass (1470, 1475), the decoder checks whether the gt2 flag is true (1470). If it is true, the remaining absolute level (abs_level_remaining) is decoded (1475). In the third scan pass (1480, 1485), the decoder checks whether the SIG flag is true (1480). If it is true, the sign flag (coeff_sign_flag) is decoded (1485). At step 1487, the decoder calculates the transform coefficients, based on the available SIG, gt1, gt2, sign flags and the remaining absolute value.

The decoder checks whether there are more CG to be processed (1490). If yes, it moves on to the next CG to be processed (1495). If all coefficients are entropy decoded, the transform coefficients are de-quantized (1497) using dependent scaler quantization. The scalar quantizer used (Q0 or Q1) used for a transform coefficient is determined by the state, which is derived using the methods as described in FIGS. 10-12, with the information of the decoded transform coefficient levels.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the entropy encoding and decoding modules (245, 330), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

According to an embodiment, a method of video decoding is provided, comprising: accessing a first set of parameters associated with a first transform coefficient in a block of a picture, said first transform coefficient preceding in a decoding order a second transform coefficient in said block of said picture; accessing a second set of parameters associated with said second transform coefficient, said first and second sets of parameters being entropy coded in a regular mode, wherein context modeling for at least a parameter in said second set of parameters for said second transform coefficient depends on decoding of said first transform coefficient; entropy decoding said first and second sets of parameters in the first scan pass for said block, wherein the first scan pass is performed before other scan passes for entropy decoding transform coefficients of said block, and wherein each set of said first and second sets of parameters for said first and second transform coefficients includes at least one of a gt1 flag and a gt2 flag, said gt1 flag indicating whether the absolute value of a corresponding transform coefficient is greater than 1, and said gt2 flag indicating whether the absolute value of said corresponding transform coefficient is greater than 2; and reconstructing said block responsive to said decoded transform coefficients.

According to an embodiment, a method of video encoding is provided, comprising: accessing a first set of parameters associated with a first transform coefficient in a block of a picture, said first transform coefficient preceding in an encoding order a second transform coefficient in said block of said picture; accessing a second set of parameters associated with said second transform coefficient, said first and second sets of parameters being entropy coded in a regular mode, wherein context modeling for at least a parameter in said second set of parameters for said second transform coefficient depends on said first transform coefficient; and entropy encoding said first and second sets of parameters in the first scan pass for said block, wherein the first scan pass is performed before other scan passes for entropy encoding transform coefficients of said block, and wherein each set of said first and second sets of parameters for said first and second transform coefficients includes at least one of a gt1 flag and a gt2 flag, said gt1 flag indicating whether the absolute value of a corresponding transform coefficient is greater than 1, and said gt2 flag indicating whether the absolute value of said corresponding transform coefficient is greater than 2.

According to another embodiment, an apparatus for video decoding is provided, comprising one or more processors, wherein said one or more processors are configured to: access a first set of parameters associated with a first transform coefficient in a block of a picture, said first transform coefficient preceding in a decoding order a second transform coefficient in said block of said picture; access a second set of parameters associated with said second transform coefficient, said first and second sets of parameters being entropy coded in a regular mode, wherein context modeling for at least a parameter in said second set of parameters for said second transform coefficient depends on decoding of said first transform coefficient; entropy decode said first and second sets of parameters in the first scan pass for said block, wherein the first scan pass is performed before other scan passes for entropy decoding transform coefficients of said block, and wherein each set of said first and second sets of parameters for said first and second transform coefficients includes at least one of a gt1 flag and a gt2 flag, said gt1 flag indicating whether the absolute value of a corresponding transform coefficient is greater than 1, and said gt2 flag indicating whether the absolute value of said corresponding transform coefficient is greater than 2; and reconstruct said block responsive to said decoded transform coefficients. The apparatus may further comprise one or more memories coupled to said one or more processors.

According to another embodiment, an apparatus for video encoding is provided, comprising one or more processors, wherein said one or more processors are configured to: access a first set of parameters associated with a first transform coefficient in a block of a picture, said first transform coefficient preceding in an encoding order a second transform coefficient in said block of said picture; access a second set of parameters associated with said second transform coefficient, said first and second sets of parameters being entropy coded in a regular mode, wherein context modeling for at least a parameter in said second set of parameters for said second transform coefficient depends on said first transform coefficient; and entropy encode said first and second sets of parameters in the first scan pass for said block, wherein the first scan pass is performed before other scan passes for entropy encoding transform coefficients of said block, and wherein each set of said first and second sets of parameters for said first and second transform coefficients includes at least one of a gt1 flag and a gt2 flag, said gt1 flag indicating whether the absolute value of a corresponding transform coefficient is greater than 1, and said gt2 flag indicating whether the absolute value of said corresponding transform coefficient is greater than 2.

According to another embodiment, an apparatus of video decoding is provided, comprising: means for accessing a first set of parameters associated with a first transform coefficient in a block of a picture, said first transform coefficient preceding in a decoding order a second transform coefficient in said block of said picture; means for accessing a second set of parameters associated with said second transform coefficient, said first and second sets of parameters being entropy coded in a regular mode, wherein context modeling for at least a parameter in said second set of parameters for said second transform coefficient depends on decoding of said first transform coefficient; means for entropy decoding said first and second sets of parameters in the first scan pass for said block, wherein the first scan pass is performed before other scan passes for entropy decoding transform coefficients of said block, and wherein each set of said first and second sets of parameters for said first and second transform coefficients includes at least one of a gt1 flag and a gt2 flag, said gt1 flag indicating whether the absolute value of a corresponding transform coefficient is greater than 1, and said gt2 flag indicating whether the absolute value of said corresponding transform coefficient is greater than 2; and means for reconstructing said block responsive to said decoded transform coefficients.

According to another embodiment, an apparatus of video encoding is provided, comprising: means for accessing a first set of parameters associated with a first transform coefficient in a block of a picture, said first transform coefficient preceding in an encoding order a second transform coefficient in said block of said picture; means for accessing a second set of parameters associated with said second transform coefficient, said first and second sets of parameters being entropy coded in a regular mode, wherein context modeling for at least a parameter in said second set of parameters for said second transform coefficient depends on said first transform coefficient; and means for entropy encoding said first and second sets of parameters in the first scan pass for said block, wherein the first scan pass is performed before other scan passes for entropy encoding transform coefficients of said block, and wherein each set of said first and second sets of parameters for said first and second transform coefficients includes at least one of a gt1 flag and a gt2 flag, said gt1 flag indicating whether the absolute value of a corresponding transform coefficient is greater than 1, and said gt2 flag indicating whether the absolute value of said corresponding transform coefficient is greater than 2.

According to another embodiment, a signal comprising encoded video is formed by performing: accessing a first set of parameters associated with a first transform coefficient in a block of a picture, said first transform coefficient preceding in an encoding order a second transform coefficient in said block of said picture; accessing a second set of parameters associated with said second transform coefficient, said first and second sets of parameters being entropy coded in a regular mode, wherein context modeling for at least a parameter in said second set of parameters for said second transform coefficient depends on said first transform coefficient; and entropy encoding said first and second sets of parameters in the first scan pass for said block, wherein the first scan pass is performed before other scan passes for entropy encoding transform coefficients of said block, and wherein each set of said first and second sets of parameters for said first and second transform coefficients includes at least one of a gt1 flag and a gt2 flag, said gt1 flag indicating whether the absolute value of a corresponding transform coefficient is greater than 1, and said gt2 flag indicating whether the absolute value of said corresponding transform coefficient is greater than 2.

According to an embodiment, said context modeling for at least a parameter in said second set of parameters for said second transform coefficient depends on decoding of said first set of parameters for said first transform coefficient, and is independent of parameters that are (1) used to represent said first transform coefficient and (2) entropy coded in a bypass mode.

According to an embodiment, a SIG flag is also encoded or decoded in the first scan pass, said SIG flag indicating whether said corresponding transform coefficient is zero or not.

According to an embodiment, said gt1 flag is encoded or decoded in the first scan pass, and said gt2 flag is encoded or decoded in the second scan pass.

According to an embodiment, a de-quantizer for de-quantizing said second transform coefficient is chosen between two or more quantizers, based on said first transform coefficient.

According to an embodiment, said de-quantizer is chosen based on said first set of parameters for said first transform coefficient.

According to an embodiment, context modeling for at least a parameter in said second set of parameters for said second transform coefficient depends on decoding of said first and second transform coefficients.

According to an embodiment, said de-quantizer is chosen based on a sum of said SIG, gt1, and gt2 flags.

According to an embodiment, said de-quantizer is chosen based on a XOR function of said SIG, gt1, and gt2 flags.

According to an embodiment, said de-quantizer is chosen based on said gt1 flag, said gt2 flag, or a gtx flag, said gtx flag indicating whether the absolute value of said corresponding transform coefficient is greater than x.

According to an embodiment, parameters (1) used to represent transform coefficients in said block and (2) coded in a bypass mode are entropy encoded or decoded in one or more scan passes after parameters (1) used to represent transform coefficients in said block and (2) coded in said regular mode.

According to an embodiment, context modeling of said SIG, gt1, gt2 flag or a gtx flag is based on the quantizer or a state used in the quantizer choice.

An embodiment provides a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

Note that the syntax elements as used herein, for example, sig_coeff_flag, abs_level_gt1_flag, are descriptive terms. As such, they do not preclude the use of other syntax element names.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method, comprising:
   entropy decoding a first type of syntax flags and a second type of syntax flags in a first scan pass for entropy decoding transform coefficients of a block in a picture, said first type of syntax flags indicating whether the absolute value of a corresponding transform coefficient is greater than 1, and said second type of syntax flags indicating whether the absolute value of said corresponding transform coefficient is greater than 3;
   entropy decoding a first type of syntax elements indicating remaining levels of transform coefficients in a second scan pass for entropy decoding said transform coefficients of said block;
   entropy decoding a second type of syntax elements indicating signs of transform coefficients in a third scan pass for entropy decoding said transform coefficients of said block;
   obtaining said transform coefficients for said block, based on said first type of syntax flags, said second type of syntax flags, said first type of syntax elements, and said second type of syntax elements; and
   reconstructing said block responsive to said obtained transform coefficients for said block.

2. The method of claim 1, wherein all syntax elements in said first scan pass are entropy decoded in a regular mode.

3. The method of claim 1, wherein all syntax elements in said second scan pass are entropy decoded in a bypass mode.

4. The method of claim 1, wherein all syntax elements in said third scan pass are entropy decoded in a bypass mode.

5. The method of claim 1, wherein one or more syntax flags, which indicate whether the absolute value of a corresponding transform coefficient is greater than x, are entropy decoded in said first scan pass or said second scan pass, wherein x is an integer greater than 3.

6. An apparatus, comprising one or more processors, wherein said one or more processors are configured to:
    entropy decode a first type of syntax flags and a second type of syntax flags in a first scan pass for entropy decoding transform coefficients of a block in a picture, said first type of syntax flags indicating whether the absolute value of a corresponding transform coefficient is greater than 1, and said second type of syntax flags indicating whether the absolute value of said corresponding transform coefficient is greater than 3;
    entropy decode a first type of syntax elements indicating remaining levels of transform coefficients in a second scan pass for entropy decoding said transform coefficients of said block;
    entropy decode a second type of syntax elements indicating signs of transform coefficients in a third scan pass for entropy decoding said transform coefficients of said block;
    obtain said transform coefficients for said block, based on said first type of syntax flags, said second type of syntax flags, said first type of syntax elements, and said second type of syntax elements; and
    reconstruct said block responsive to said obtained transform coefficients for said block.

7. The apparatus of claim 6, wherein all syntax elements in said first scan pass are entropy decoded in a regular mode.

8. The apparatus of claim 6, wherein all syntax elements in said second scan pass are entropy decoded in a bypass mode.

9. The apparatus of claim 6, wherein all syntax elements in said third scan pass are entropy decoded in a bypass mode.

10. The apparatus of claim 6, wherein one or more syntax flags, which indicate whether the absolute value of a corresponding transform coefficient is greater than x, are entropy decoded in said first scan pass or said second scan pass, wherein x is an integer greater than 3.

* * * * *